(12) United States Patent
Crafts et al.

(10) Patent No.: US 6,664,511 B2
(45) Date of Patent: Dec. 16, 2003

(54) PACKAGE FOR OPTICAL COMPONENTS

(75) Inventors: Douglas E. Crafts, San Jose, CA (US); James F. Farrell, San Jose, CA (US); Mark B. Farrelly, San Jose, CA (US); Suresh Ramalingam, Fremont, CA (US); Kenzo Ishida, San Jose, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/281,876

(22) Filed: Oct. 28, 2002

(65) Prior Publication Data

US 2003/0085212 A1 May 8, 2003

Related U.S. Application Data

(63) Continuation-in-part of application No. 09/901,474, filed on Jul. 9, 2001, now Pat. No. 6,486,440.

(51) Int. Cl.7 ................................................ H05B 1/00
(52) U.S. Cl. ...................... 219/209; 219/210; 219/520; 219/385
(58) Field of Search ................................ 219/209, 210, 219/520, 530, 544, 385, 494; 324/760; 331/69; 359/512; 428/344

(56) References Cited

U.S. PATENT DOCUMENTS

| | | | | |
|---|---|---|---|---|
| 3,662,150 A | | 5/1972 | Hartung | 219/209 |
| 3,883,715 A | | 5/1975 | Gebo | 219/210 |
| 4,404,459 A | * | 9/1983 | Harton | 219/209 |
| 4,553,020 A | * | 11/1985 | Val | 219/209 |
| 4,684,783 A | | 8/1987 | Gore | 219/210 |
| 4,978,914 A | | 12/1990 | Akimoto et al. | 324/760 |
| 5,574,627 A | | 11/1996 | Porter | 219/209 |
| 5,585,024 A | | 12/1996 | Kosugi | 219/494 |
| 5,591,364 A | * | 1/1997 | Suppelsa et al. | 219/209 |
| 5,624,750 A | | 4/1997 | Martinez et al. | 428/344 |
| 5,818,097 A | * | 10/1998 | Rohlfing | 219/210 |
| 5,917,272 A | | 6/1999 | Clark et al. | 219/210 |
| 5,919,383 A | | 7/1999 | Beguin et al. | 219/209 |
| 5,994,679 A | | 11/1999 | DeVeau et al. | 219/530 |
| 6,114,673 A | | 9/2000 | Brewer et al. | 219/530 |
| 6,127,660 A | | 10/2000 | Scafati | 219/209 |
| 6,144,013 A | | 11/2000 | Chu et al. | 219/209 |
| 6,330,152 B1 | | 12/2001 | Vos et al. | 219/209 |
| 6,486,440 B1 | * | 11/2002 | Crafts et al. | 219/209 |
| 6,583,388 B2 | * | 6/2003 | Crafts et al. | 219/209 |

* cited by examiner

*Primary Examiner*—Sang Y. Paik
*Assistant Examiner*—Fadi H. Dahbour
(74) *Attorney, Agent, or Firm*—Allen, Dyer, Doppelt, Milbrath & Gilchrist, P.A.

(57) ABSTRACT

A package for optical components includes an inner package enclosing the optical component, and an outer package enclosing the inner package. A heater may be disposed in the inner package proximate the optical component to control its temperature, and to maintain this temperature control, the outer package creates an isolated air pocket around the inner package, which thermally insulates the inner package from the outside environment. The outer package is formed of a material having low thermal conductivity, to promote this insulating function. This package is especially useful if the optical component comprises a planar light-wave circuit (PLC), e.g. an arrayed waveguide grating (AWG), which requires tight temperature control and structural integrity to maintain the integrity of the optical paths.

12 Claims, 6 Drawing Sheets

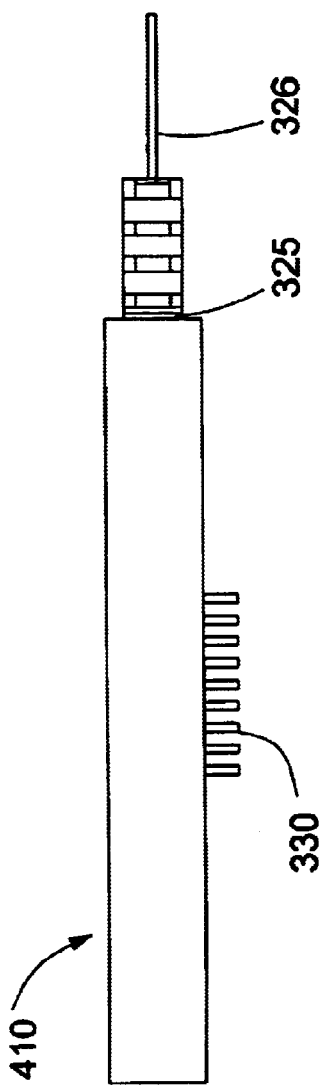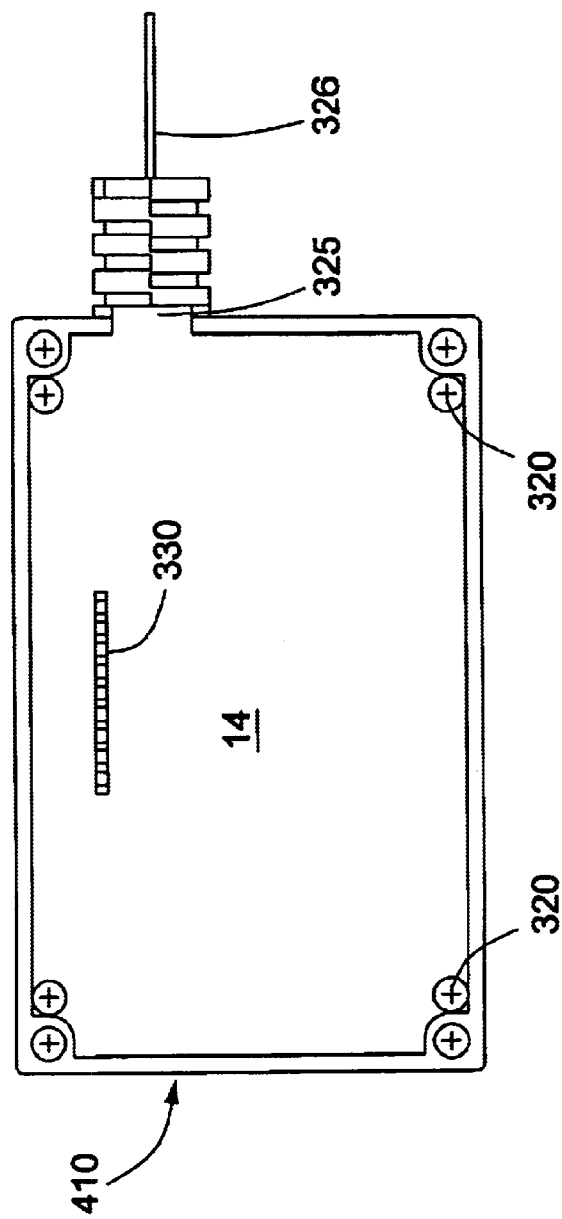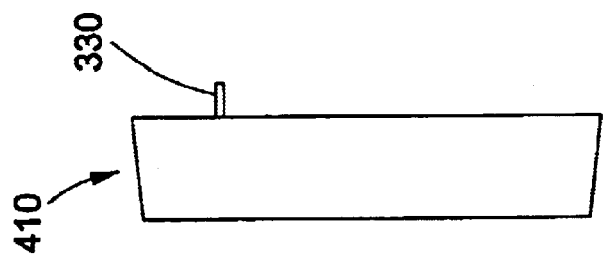

PACKAGE FOR OPTICAL COMPONENTS

The present invention is a continuation in part of U.S. patent Ser. No. 09/901,474 filed Jul. 9, 2001 now U.S. Pat. No. 6,486,440.

FIELD OF THE INVENTION

The present invention relates to component packaging. More particularly, the present invention relates to a redundant package for isolating optical components (e.g. arrayed waveguide gratings) from external stresses.

BACKGROUND OF THE INVENTION

Fiber optic communication links have been conventionally employed in long-haul, point-to-point networks with controlled environments at all interface points. Such highly controlled, "central office" surroundings usually offer relatively benign operating environments (temperature, humidity, mechanical) for components. Consequently, highly functional components could be developed and installed without considering the impact of other, more extreme environments.

Recent technological advances, coupled with increasing bandwidth demand, are rapidly expanding the use of fiber optic components beyond the "central office" and into potentially harsher environments. For example, dense wavelength division multiplexing (DWDM) enables the transmission of multiple, independent wavelength streams across a single fiber. Predictably, this capability has resulted in the requirement to add or drop these optical channels along the previously untapped long lengths of fiber (and outside of the central office environment) to provide access to the individual wavelength streams. Optical add/drop multiplexers (OADM) are employed for this function, enabled by arrayed waveguide grating (AWG) components for filtering and forwarding individual wavelengths.

In addition to these technological advances, simple market forces are pushing fiber networks beyond central offices and into the diverse terrain of "metro" markets. This ever-increasing need for bandwidth which only fiber can deliver is resulting in the widespread deployment of fiber networks, and their associated components, into the harsher, less environmentally controlled conditions present in the metro market.

The demands placed on component designers now reach far beyond optical performance, and into the realms of thermal and mechanical insulation. Certain qualification standards (e.g. Telcordia) exist for reliability of optical components, and many customers require qualification under these standards. AWGs however are thin, fragile chips with narrow waveguides produced using planar light-wave circuit (PLC) processing techniques. The various processing tolerances required to meet the requisite optical specifications are already very tight, and in fact get tighter as the need to process more and closer channels increases. It is difficult and costly to impose yet additional requirements on the chip process in the form of advanced materials, processing techniques, etc. to satisfy the harsher environmental standards discussed above.

Environmentally secure packages therefore now play a vital role in the widespread commercialization of these devices. Without adequate packaging, components such as AWGs, with their highly unique and useful functions, would be relegated to laboratory environments only.

What is required, therefore, are advanced packaging techniques to enable the widespread use of otherwise fragile optical components in diverse and often stressful environments.

SUMMARY OF THE INVENTION

Accordingly, the present invention relates to a package for an optical component comprising: a package base; a heater affixed to the package base, to control the temperature of the optical component, the heater having a coefficient of thermal expansion substantially matched to that of the optical component; sidewalls affixed to the base around the heater and optical component; and a lid affixed over the sidewalls. The optical component is disposed over the heater and in thermal contact therewith.

This package is especially useful if the optical component comprises a planar light-wave circuit (PLC), e.g. an arrayed waveguide grating (AWG), which requires tight temperature control and structural integrity to maintain the integrity of the optical paths.

BRIEF DESCRIPTION OF THE DRAWINGS

The subject matter, which is regarded as the invention, is particularly pointed out and distinctly claimed in the concluding portion of the specification. The invention, however, both as to organization and method of practice, together with further objects and advantages thereof, may be best understood by reference to the following detailed description of the preferred embodiments and the accompanying drawings in which:

FIGS. 6a, 6b and 6c are the bottom, end and side views, respectively, of a redundant package including the inner package of FIGS. 5a, 5b and 5c.

DETAILED DESCRIPTION

Figure 1:
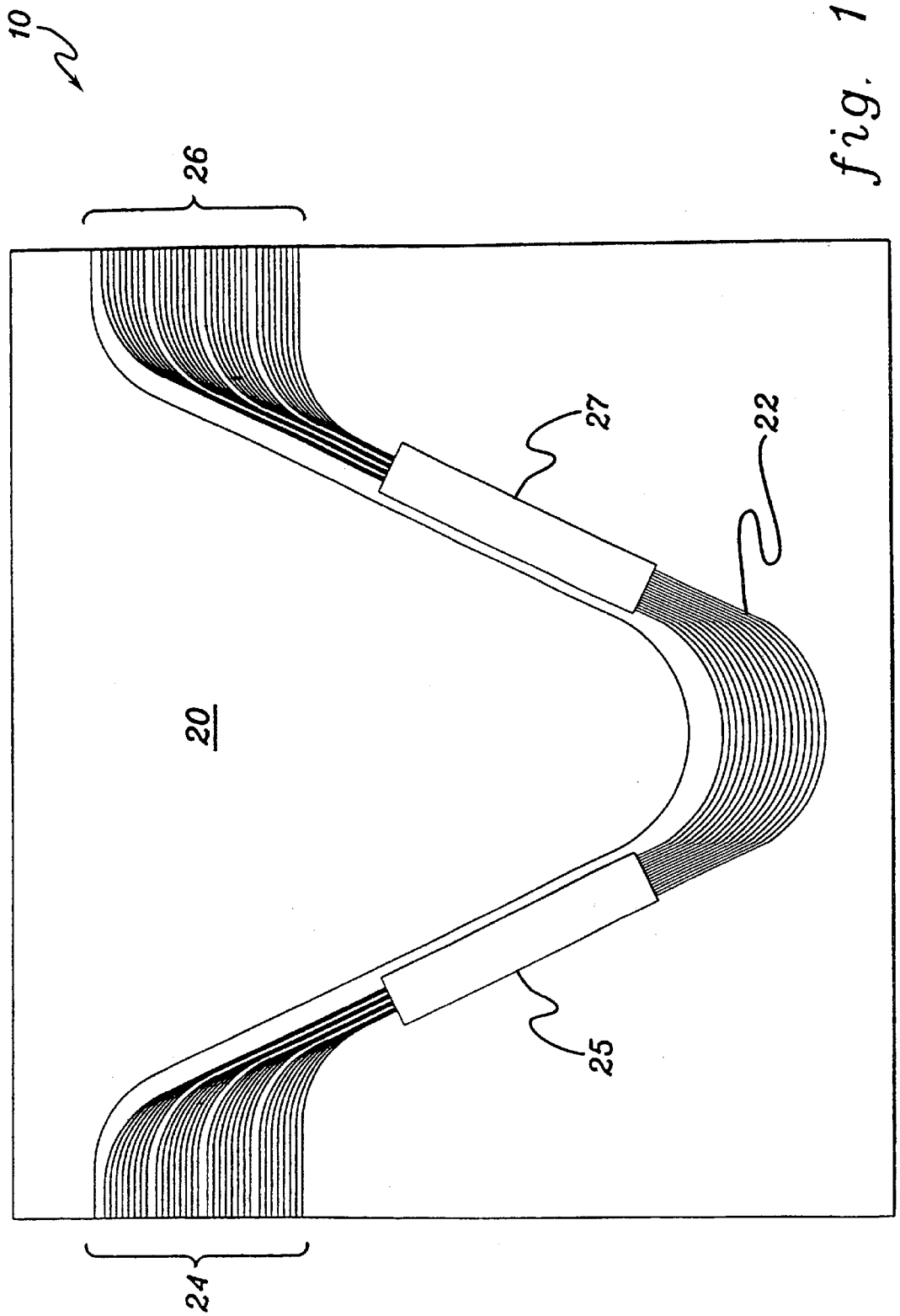
FIG. 1 is a typical AWG PLC requiring packaging.

With reference to FIG. 1, an exemplary planar light-wave circuit (PLC) 10 is shown with an arrayed waveguide grating (AWG) 22 on a substrate 20 (e.g. silicon). As known to those in the art, an AWG uses an array of waveguides 22 having carefully controlled and differing path lengths, which cause constructive phase interference patterns on the optical signals transmitted therein. This technique is useful for multiplexing or de-multiplexing optical signals passed between the array input/focusing region 24/25 to the array output/focusing region 26/27. The tight spatial and thermal tolerances necessary for proper operation of array 20, as discussed above, lead to the requirements for effective packaging and sealing for use in adverse environmental conditions.

Figure 2:
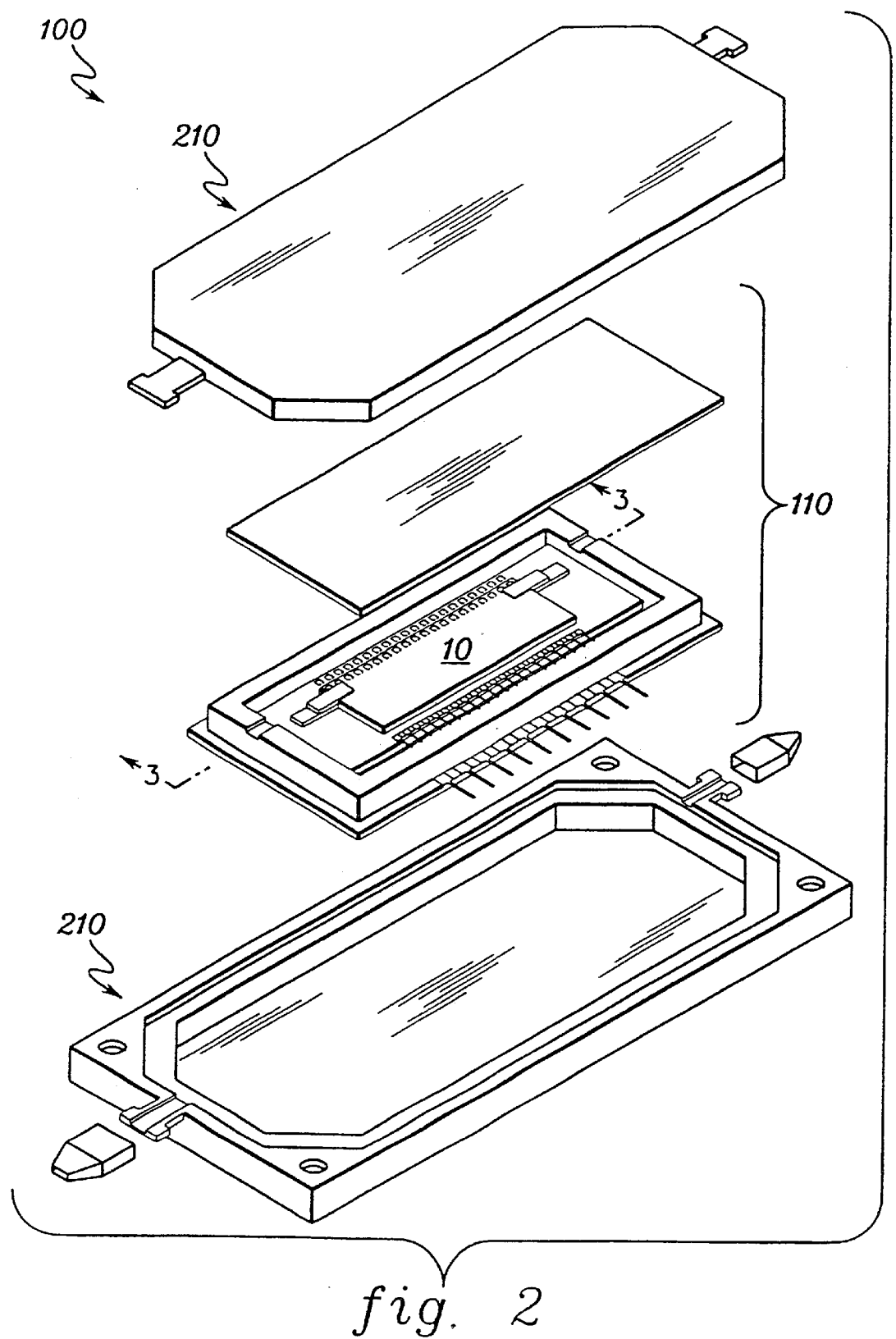
FIG. 2 is an exploded view of the redundant package of the present invention including a PLC mounted in an inner package.

In accordance with the present invention, and with reference to FIG. 2, a redundant package 100 is disclosed having an inner package 110 within which the PLC 10 is mounted, and an outer package 210 for enclosing the inner package. As discussed further below, both packages are designed with appropriate materials and structures to maximize thermal and mechanical insulation from surrounding environments.

Figure 3:
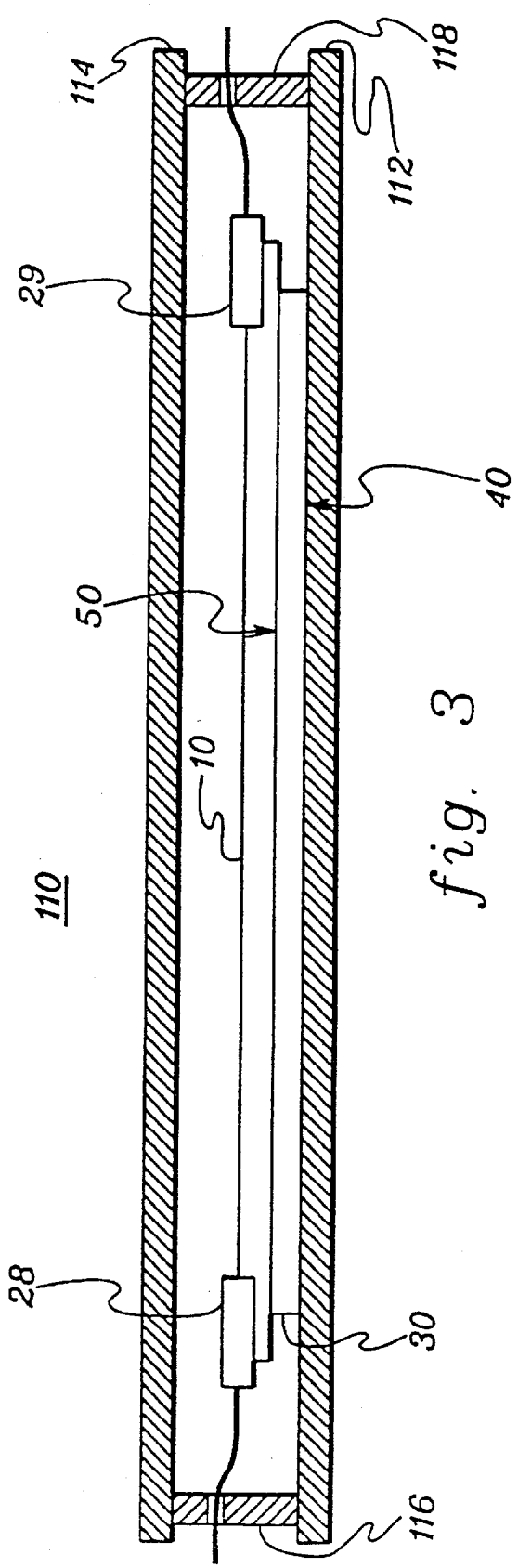
FIG. 3 is a cross-sectional view of the inner package containing the PLC.

For example, and with reference to FIG. 3 (a cross-sectional view of the inner package along line AA) the base 112 of this inner package is similar to a PC board and is formed of a type of fiberglass reinforced plastic with a coefficient of thermal expansion of less than 12 ppm/° C., and preferably from a non-conventional FR5 with a coefficient of thermal expansion of approximately 9 ppm/° C. providing good planarity of the sub-assembled parts mounted thereon. A heater element 30 formed of aluminum nitride is surface-mounted onto base 112, at interface 40. A layer of J-leads (not shown) may also be disposed at this interface. Heater 30 is used to ensure that PLC 10 is maintained at a constant temperature (very uniformly across its surface), since temperature changes will cause minor structural changes in AWG signal paths, and negatively impact its optical performance.

Silicon PLC 10 is then mounted onto heater 30 at interface 50 using, for example, a low modulus silicon material. Aluminum nitride is chosen for heater 20 since its coefficient of thermal expansion (CTE) is approximately 4.5 ppm/° C., which matches that of the silicon PLC, thus preventing any adverse thermo-mechanical stress at this interface. Aluminum nitride also provides high thermal conductivity (TC), approximately 170–200 W/mK at room temperature (20° C.). Materials with a thermal conductivity above 125 W/mK are preferred, and materials with relatively high thermal conductivities combined with Si-matched CTE are particularly preferred. These materials may include Si Carbide (TC=80+W/mK and CTE=3.8–4.3 ppm/° C.). Such materials in general are highly thermally conductive, providing high uniformity of temperature across the heater.

Package walls 116, 118 are also formed from FR5, and joined to base 112 using an epoxy. V-groove arrays 28 and 29 on PLC 10 provide the interface to input and output fiber ribbons, which are carried out of the package over upper recesses in the sidewalls, and FR5 lid 114 is then epoxied in place over walls 116 and 118. The recessed sidewall openings are also sealed with epoxy.

Figure 4:
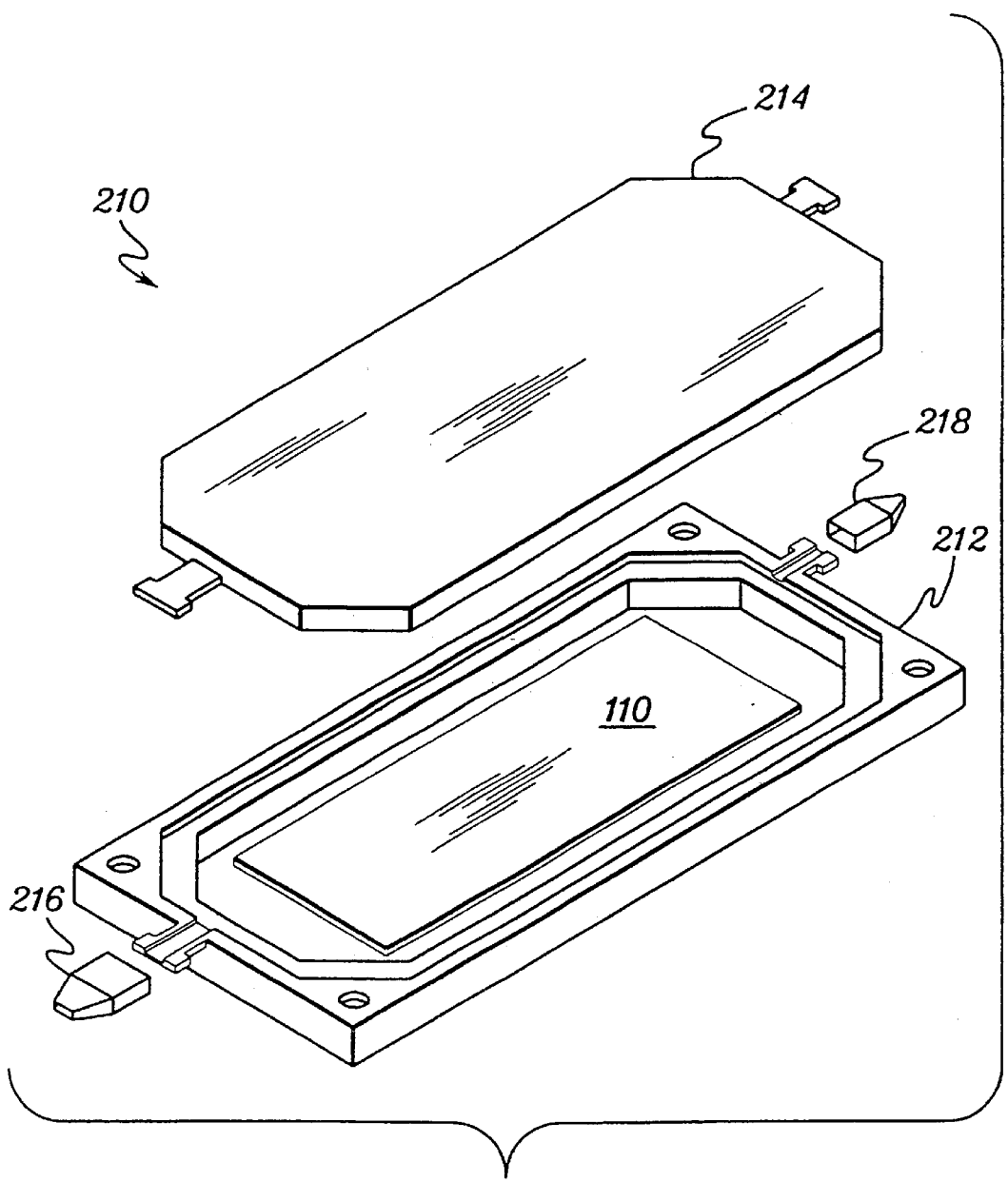
FIG. 4 is an exploded view of the outer package of the present invention.

With reference to the exploded view of the outer package 210 of FIG. 4, this package is typically formed from polycarbonate plastic, although the use of other materials, which have low thermal conductivity, is possible. An epoxy is used to affix the inner package 110 into base 212, and lid 214 is then affixed and sealed to the base using a silicon epoxy. The fiber input and output ribbons are accommodated through the side ports, with strain relief sleeves 216 and 218. These ports are sealed using epoxy also. The isolated airspace created around the inner package by the outer package thermally insulates the AWG device environment from the outside ambient environment. The thermal isolation reduces the power consumption required to maintain tight temperature control of the device and reduces thermally induced mechanical stresses, which could negatively affect the device performance or reliability. These parameters are critical to the commercial viability of the device. The outer package is preferably formed of a material having low thermal conductivity, i.e. less than 50 W/mK, to promote this insulating function.

Figure 5A:
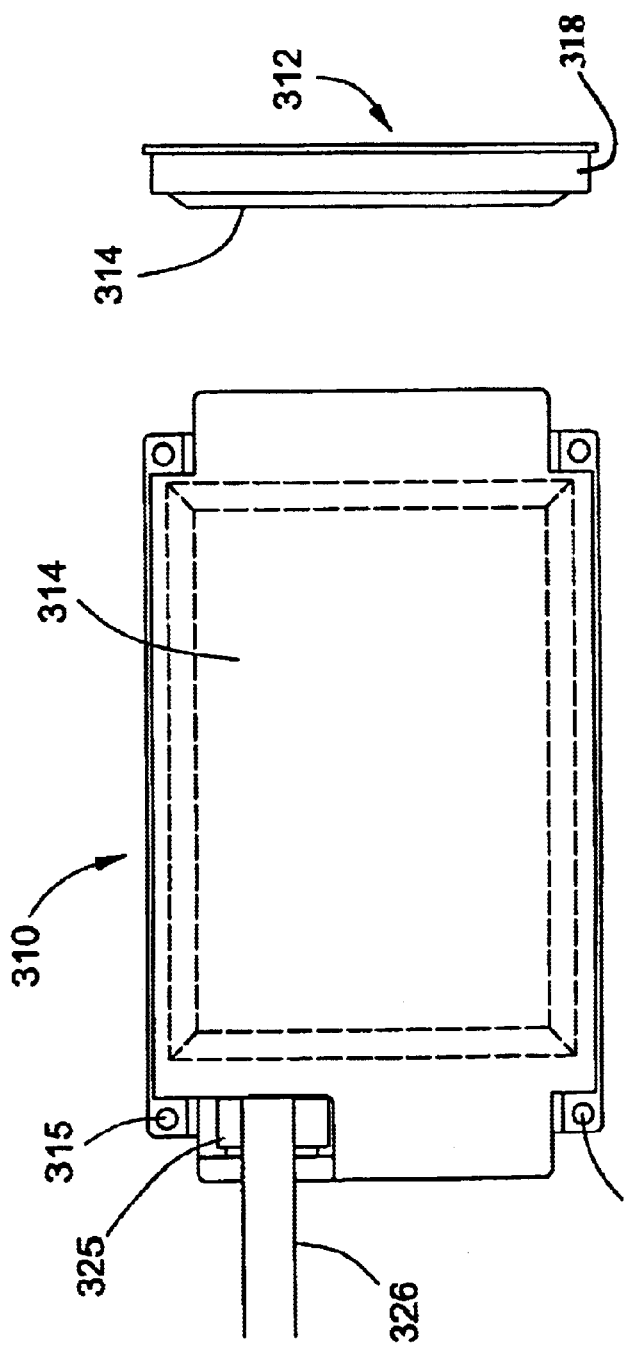
FIGS. 5a, 5b and 5c are the top, end and side views, respectively, of an inner package according to another embodiment of the present invention.
Figure 5B:
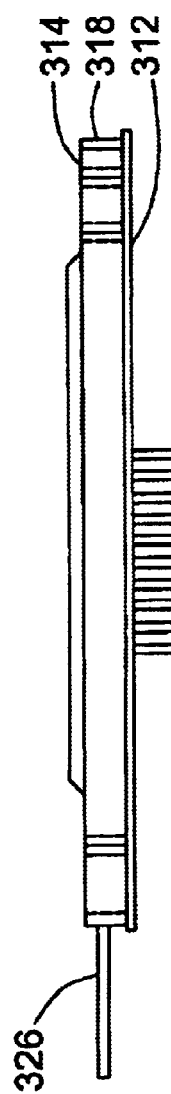
Figure 5C:
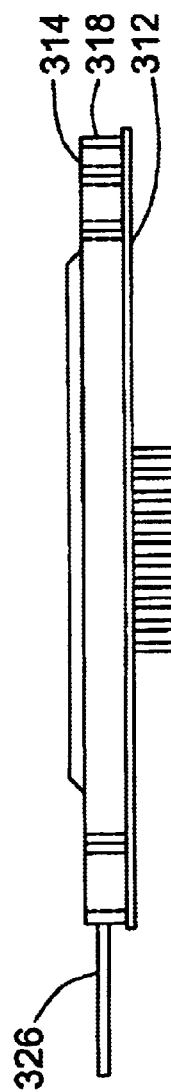

FIGS. 5 and 6 illustrate an alternative embodiment of the present invention, in which an outer package 410, with one open side, substantially encloses only sidewalls 318 and cover 314 of an inner package 310. A base 312 acts as the bottom of the inner package 310 and the outer package 410. FIG. 5 illustrates the inner package 310, while FIG. 6 illustrates the outer package 410 substantially covering the inner package 310 with the base 312 of the inner package 310 closing the open side of the outer package 410 when the two packages 310 and 410 are mated together. Mounting flanges 315 are provided on the inner package 310 for receiving fasteners 320, which are use to fix the inner package 310 to the outer package 410. An input/output port 325 receives both an input and an output optical fiber bundled together in sleeve 326. Leads 330 extend through the base 312 of the inner package 310 for electrically connecting the heater to an appropriate power supply (not shown).

The inner package of the present invention maintains tight temperature control around the highly temperature-sensitive optical component (e.g. PLC/AWG). The redundant, outer package ensures this tight control by the airspace insulation, and through the choice of non-thermally conductive materials. Moreover, the redundant outer package ensures greater structural integrity, and additional sealing from humidity and other environmental factors.

While the invention has been particularly described with reference to preferred embodiments, it will be understood by those skilled in the art that various changes in form and detail may be made therein without departing from the spirit and scope of the invention.

What is claimed is:

1. A package for an optical component comprising:
   a package base;
   a heater affixed to the package base, to control the temperature of the optical component, the heater having a coefficient of thermal expansion substantially matched to that of the optical component;
   sidewalls affixed to the base around the heater and optical component; and
   a lid affixed over the sidewalls;
   wherein the optical component is disposed over the heater and in thermal contact therewith.

2. The package according to claim 1, wherein the heater is affixed to the package base with a layer of J-leads.

3. The package according to claim 1, wherein the heater has a thermal conductivity greater than 125 W/mK@ 20° C., resulting in high temperature uniformity.

4. The package according to claim 3, wherein the heater is an aluminum nitride heater with a thermal conductivity of 170 W/mK @ 20° C. or greater.

5. The package according to claim 1, wherein the package base comprises a type of fiberglass reinforced plastic.

6. The package according to claim 5, wherein the package base has a CTE less than 12 ppm/° C.

7. The component package of claim 6, wherein the package base comprises an FR5 board with a CTE of 9 ppm/° C. or less.

8. The package according to claim 1, further comprising:
   an outer package substantially enclosing at least the side walls and the lid.

9. The package according to claim 8, wherein the outer package creates an isolated air space around at least the side walls and the lid, which thermally insulates the optical component from the outside environment.

10. The package according to claim 9, wherein the outer package is formed of a material having a thermal conductivity less than 50 W/mK.

11. The package according to claim 1, wherein the optical component comprises a planar light-wave circuit (PLC).

12. The component package of claim 11, wherein the PLC comprises an arrayed waveguide grating.

\* \* \* \* \*